US009894017B2

(12) United States Patent
Mibu

(10) Patent No.: US 9,894,017 B2
(45) Date of Patent: Feb. 13, 2018

(54) COMMUNICATION SYSTEM, PHYSICAL MACHINE, VIRTUAL NETWORK MANAGEMENT APPARATUS, AND NETWORK CONTROL METHOD

(71) Applicant: NEC Corporation, Minato-ku, Tokyo (JP)

(72) Inventor: Ryota Mibu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 14/775,040

(22) PCT Filed: Mar. 11, 2014

(86) PCT No.: PCT/JP2014/056256
§ 371 (c)(1),
(2) Date: Sep. 11, 2015

(87) PCT Pub. No.: WO2014/142094
PCT Pub. Date: Sep. 18, 2014

(65) Prior Publication Data
US 2016/0028657 A1 Jan. 28, 2016

(30) Foreign Application Priority Data

Mar. 12, 2013 (JP) ................. 2013-049167

(51) Int. Cl.
*H04L 12/931* (2013.01)
*H04L 12/46* (2006.01)
*H04L 12/935* (2013.01)

(52) U.S. Cl.
CPC .......... *H04L 49/70* (2013.01); *H04L 12/4641* (2013.01); *H04L 49/30* (2013.01)

(58) Field of Classification Search
CPC .... H04L 49/70; H04L 45/745; H04L 12/4625
See application file for complete search history.

(56) References Cited

U.S. PATENT DOCUMENTS

2007/0110077 A1* 5/2007 Takashige ........... H04L 12/4675
370/395.53
2009/0119087 A1 5/2009 Ang et al.
(Continued)

FOREIGN PATENT DOCUMENTS

| JP | 2008271050 A | 11/2008 |
| JP | 2012244621 A | 12/2012 |
| WO | 2008095010 A1 | 8/2008 |

OTHER PUBLICATIONS

Extended European Search Report for EP Application No. EP14763119.6 dated Sep. 13, 2016.
(Continued)

*Primary Examiner* — Jackie Zuniga Abad

(57) ABSTRACT

A communication system comprises: a physical machine; a switch control apparatus that controls a physical switch connected to the physical machine; and a virtual network management apparatus that manages a virtual network using the physical switch and at least one of the physical machine and a virtual machine operating on the physical machine. The physical machine comprises: a port information collection unit that collects port information of a NIC (Network Interface Card) assigned to the virtual network; and a port information notification unit that notifies the virtual network management apparatus of a correspondence between the NIC and the collected port information. The virtual network management apparatus instructs the switch control apparatus so that the physical switch uses the port information as a match condition.

20 Claims, 7 Drawing Sheets

(56) References Cited

U.S. PATENT DOCUMENTS

2011/0035494 A1 2/2011 Pandey et al.
2012/0294192 A1* 11/2012 Masood .............. H04L 12/4645
370/255

OTHER PUBLICATIONS

IEEE Standard for Local and metropolitan area networks "Virtual Bridged Local Area Networks" IEEE Std 802.1Q™-2005, ISBN 0/7381-3662-X, May 19, 2006.
Nick McKeown et al, "OpenFlow: Enabling Innovation in Campus Networks", Mar. 14, 2008.
"OpenFlow Switch Specication Version 1.1.0 Implemented ( Wire Protocol 0x02 )" Feb. 28, 2011.
"Sliceable switch tutorial" Apr. 26, 2012.
IEEE Standard for Local and metropolitan area networks, "Station and Media Access Control Connectivity Discovery" IEEE Std 802.1AB 2009 Sep. 17, 2009.
"Neutron/NEC OpenFLow Plug in".
"PCI Passthrough base", Apr. 10, 2015.
"Baremetal—OpenStack", Apr. 10, 2015.
International Search Report for PCT Application No. PCT/JP2014/056256, dated May 13, 2014.

* cited by examiner

FIG. 3

| Type | Length | Value |
|---|---|---|
| 1 (SWITCH ID) | 6 | 0x1001 |
| 2 (PORT NUMBER) | 1 | 1 |

FIG. 4

| VIRTUAL NETWORK ID | NIC ID |
|---|---|
| 0x1 | 50a-1 |
| 0x1 | 50b-1 |

FIG. 5

| NIC ID | SWITCH IDENTIFICATION INFORMATION (DPID) | PORT NUMBER |
|---|---|---|
| 50a-1 | 0x1001 | 1 |
| 50b-1 | 0x1001 | 2 |

FIG. 6

| VIRTUAL NETWORK ID | SWITCH IDENTIFICATION INFORMATION (DPID) | PORT NUMBER |
|---|---|---|
| 0x1 | 0x1001 | 1 |
| 0x1 | 0x1001 | 2 |

COMMUNICATION SYSTEM, PHYSICAL MACHINE, VIRTUAL NETWORK MANAGEMENT APPARATUS, AND NETWORK CONTROL METHOD

CROSS-REFERENCE TO RELATED APPLICATIONS

The present application is a National Stage Entry of PCT/JP2014/056256 filed Mar. 11, 2014, which is based on and claims the benefit of the priority of Japanese Patent Application No. 2013-049167, filed on Mar. 12, 2013, the disclosures of all of which are incorporated herein in their entirety by reference. The present invention relates to a communication system, a physical machine, a virtual network management apparatus, and a network control method, and in particular to a communication system that provides a virtual network using virtualization technology, a physical machine that provides a virtual machine, a virtual network management apparatus, and a network control method.

TECHNICAL FIELD

Background

Arrangement of cloud infrastructure (also known as "IaaS: Infrastructure as a Service") is proceeding, providing users with physical machines, networks and the like, as virtualized resources (for example, virtual machines, virtual networks). In general, as a network configuration in a cloud infrastructure, a configuration is employed in which virtual switches are arranged on physical machines connected to each other by physical switches, and virtual machines (VM) are connected to the virtual switches.

According to the abovementioned network configuration, with regard to virtual switches, by controlling packets flowing through ports connected to the virtual machines, it is possible to implement a virtual network. Specifically, it is possible to use a Virtual LAN (VLAN: Virtual Local Area Network) as illustrated in Non-Patent Literature 1. First, when a user defines a virtual network, a virtual LAN identifier (VLAN ID (Identification)) is assigned that is unique in an entire system. Then, when a virtual machine is started up, in order to belong to the assigned virtual LAN, a port linked to the virtual machine is set by a switch or a hypervisor. By this setting, after a VLAN ID is attached at the abovementioned port, a packet sent from the virtual machine is forwarded to a port belonging to the same virtual network, and with the VLAN ID being removed at an output node, is passed to a destination virtual machine.

Meanwhile, technology known as OpenFlow has been proposed (see Patent Literature 1 and Non-Patent Literature 2 and 3). In OpenFlow, communication is taken as end-to-end flow, and path control, failure recovery, load balancing, and optimization are performed on a per-flow basis. An OpenFlow switch as specified in Non-Patent Literature 2 is provided with a secure channel for communication with an OpenFlow controller, and operates according to a flow table in which addition or rewriting is instructed by the OpenFlow controller, as appropriate. In the flow table, for each flow there are definitions of sets of match conditions (Match Fields) for collation with packet headers, flow statistical information (Counters), and instructions (Instructions) that define processing content (refer to "4.1 Flow Table" in Non Patent Literature 3).

For example, when an OpenFlow switch receives a packet, a search is made for an entry having a match condition (refer to "4.3 Match Fields" in Non-Patent Literature 3) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Instructions field of the entry in question, for the received packet. On the other hand, as a result of the search, in a case where an entry matching the received packet is not found, the OpenFlow switch transmits a request for entry setting, to the OpenFlow controller via the secure channel, that is, a request (a Packet-In message) to transmit control information for processing the received packet. The OpenFlow switch receives a flow entry determined by processing content and updates the flow table. In this way, the OpenFlow switch preforms packet forwarding using entries stored in the flow table as control information.

In Non-Patent Literature 4 there is a description of enabling building of a virtual network, similar to a virtual LAN, by combining an OpenFlow switch and an OpenFlow controller known as a "Sliceable Switch," and a description that it is possible to have a setting based on making correspondence of ports with virtual network known as "Port-based Binding." In addition, there is a description that a port is specified by a switch ID, a port number for a switch, and a VLAN ID. (Below, a switch ID and a port number for a switch are referred to as "port information.")

Non-Patent Literature 4 furthermore has a description of using LLDP (Link Layer Discovery Protocol), described in Non-Patent Literature 5. LLDP is a standard protocol for collecting information such as apparatus identifier and adjacent apparatus, which is necessary for comprehending network topology.

Non-Patent Literature 6 describes a component known as an "Agent" that collects port information. It is to be noted that this port information is information obtained from a local virtual switch of the machine in question.

In addition, Non-Patent Literature 7 describes technology enabling usage, by cloud infrastructure, of a technique known as PCI (Peripheral Component Interconnect) passthrough, which provides a physical NIC (Network Interface Card) of a machine to a virtual machine. According to this technology, speeding up of processing can be anticipated, not going via a virtual switch on a machine.

Non-Patent Literature 8 describes a system (referred to below as "bare metal") where a physical machine similar to a virtual machine is lent out. It is described that in this system, port information is registered in advance.

PTL 1:
International Publication No. 2008/095010
NPL 1:
IEEE Std. 802.1Q-2005, "Virtual Bridged Local Area Networks," ISBN 0-7381-3662-X.
NPL 2:
Nick McKeown and seven others, "OpenFlow: Enabling Innovation in Campus Networks," [online], [Search conducted on Oct. 18, 2012], Internet <URL:http://www.openflow.org/documents/openflow-wp-latest.pdf>.
NPL 3:
"Openflow Switch Specification Version 1.0.0. Implemented (Wire Protocol 0x02)," [online], [Search conducted on Oct. 18, 2012], Internet <URL:http://www.openflow.org/documents/openflow-spec-v1.1.0.pdf>.

NPL 4:
"Sliceable Switch Tutorial," [online], [Search conducted on Jan. 30, 2013], Internet <URL: https://github.com/trema/apps/wiki/sliceable_switch_tutorial>.

NPL 5:
"IEEE standard 802.1AB-2009," [online], [Search conducted on Jan. 30, 2013], Internet <URL: http://standards.ieee.org/getieee802/download/802.1AB-2009.pdf>.

NPL 6:
"Quantum NEC OpenFlow Plugin," [online], [Search conducted on Jan. 30, 2013], Internet <URL: http://wiki.openstack.org/Quantum-NEC-OpenFlow-Plugin>.

NPL 7:
"Support for PCI passthrough and SR-IOV," [online], [Search conducted on Jan. 30, 2013], Internet <URL: https://blueprints.launchpad.net/nova/+spec/pci-passthrough-base>.

NPL 8:
"General Bare Metal Provisioning Framework," [online], [Search conducted on Jan. 30, 2013], Internet <URL: https://wiki.openstack.org/w/index.php?title=Baremetal&oldid=14589>

SUMMARY

The entire disclosed contents of the abovementioned Patent Literature and Non-Patent Literature are incorporated herein by reference thereto. The following analysis is given according to the present inventor.

In a cloud infrastructure, where a configuration is employed not going through a virtual switch on a machine as in PCI (Peripheral Component Interconnect) passthrough or bare metal, there is a problem in that it is not possible to obtain port information from a virtual switch.

Accordingly, it is necessary to register port information in a separate DB (Database) before starting up a virtual machine and before providing a machine.

Therefore, there is a need in the art for automatic setting for a virtual network in a cloud platform with a network configuration that does not use virtual switches.

According to a first aspect of the present invention, there is provided a communication system, comprising: a physical machine; a switch control apparatus that controls a physical switch connected to the physical machine; and a virtual network management apparatus that manages a virtual network using the physical switch and at least one of the physical machine and a virtual machine operating on the physical machine. The physical machine comprises: a port information collection unit that collects port information of a NIC (Network Interface Card) assigned to the virtual network; and a port information notification unit that notifies the virtual network management apparatus of a correspondence between the NIC and the collected port information. The virtual network management apparatus instructs the switch control apparatus so that the physical switch uses the port information as a match condition.

According to a second aspect of the present invention, there is provided a physical machine in a communication system comprising a switch control apparatus that controls a physical switch and a virtual network management apparatus that manages a virtual network, the physical machine being connected to the physical switch. The physical machine comprises: a port information collection unit that collects port information of a NIC (Network Interface Card) assigned to the virtual network; and a port information notification unit that notifies the virtual network management apparatus of a correspondence between the NIC and the collected port information. The virtual network is configured using the physical switch and at least one of the physical machine and a virtual machine operating on the physical machine. The virtual network management apparatus instructs the switch control apparatus so that the port information is used as a match condition by the physical switch.

According to a third aspect of the present invention, there is provided a virtual network management apparatus in a communication system comprising a physical machine and a switch control apparatus that controls a physical switch connected to the physical machine. The virtual network management apparatus comprises: a managing unit that manages a virtual network using the physical switch and at least one of the physical machine and a virtual machine operating on the physical machine; and an instructing unit that, upon notification from the physical machine of port information of a NIC (Network Interface Card) assigned to the virtual network, instructs the switch control apparatus so that the physical switch uses the port information as a match condition.

According to a fourth aspect of the present invention, there is provided a network control method in a communication system comprising a physical machine, a switch control apparatus that controls a physical switch connected to the physical machine, and a virtual network management apparatus that manages a virtual network using the physical switch and at least one of the physical machine and a virtual machine operating on the physical machine. The network control method comprises: by the physical machine, collecting port information of a NIC (Network Interface Card) assigned to the virtual network; notifying of a correspondence between the NIC and the collected port information to the virtual network management apparatus; and by the virtual network management apparatus, instructing the switch control apparatus so that the physical switch uses the port information as a match condition.

The present invention provides the following advantage, but not restricted thereto. According to the communication system, the physical machine, the virtual network management apparatus and the network control method according to the present invention, in a cloud infrastructure with a network configuration that does not use a virtual switch, setting of the virtual network is automated.

BRIEF DESCRIPTION OF THE DRAWINGS

FIG. 3 is a diagram showing port information included in an LLDP from a physical switch of the first exemplary embodiment.

FIG. 4 is a diagram showing correspondences between a NIC and a virtual network set in a virtual network management unit of the first exemplary embodiment.

FIG. 5 is a diagram showing port information of a NIC, notified from a virtual machine server and held in a virtual network management unit, in the first exemplary embodiment.

FIG. 6 is a diagram showing correspondences between a port information and a virtual network held in a virtual network management unit of the first exemplary embodiment.

PREFERRED MODES

Figure 1:
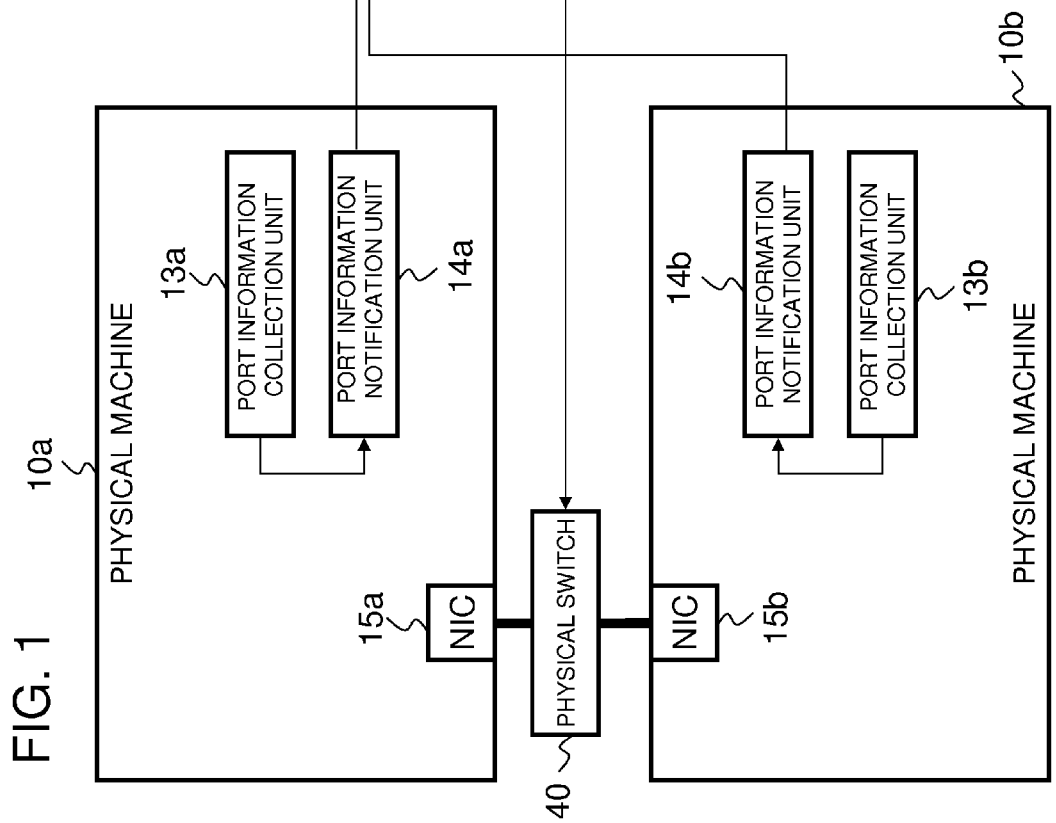
FIG. 1 is a diagram showing a configuration of a communication system according to an exemplary embodiment.

In the present disclosure, there are various possible modes, which include the following, but not restricted thereto. First, a description is given of an outline of an exemplary embodiment, making reference to the drawings. It is to be noted that reference symbols in the drawings attached to this outline are added to respective elements for convenience as examples in order to aid understanding, and are not intended to limit the present invention to modes illustrated in the drawings.

FIG. 1 is a block diagram showing a configuration of a communication system according to the exemplary embodiment. Referring to FIG. 1, a communication network is provided with physical machines 10a and 10b, a switch control apparatus 30 that controls a physical switch 40 connected to the physical machines 10a and 10b, and a virtual network management apparatus 20.

The physical machine 10a (10b) has a port information collection unit 13a (13b) and a port information notification unit 14a (14b).

The virtual network management apparatus 20 manages a virtual network using the physical machines 10a and 10b, and the physical switch 40. It is to be noted that in a case where the physical machines 10a and 10b are virtual machine (VM) servers, the virtual network management apparatus 20 may manage the virtual network using virtual machines operating on the physical machines 10a and 10b, and the physical switch 40.

The port information collection unit 13a (13b) collects port information of a NIC (Network Interface Card) 15a (15b) assigned to the virtual network. It is to be noted that the switch control apparatus 30 may instruct the physical switch 40 to transmit the port information, and the port information collection unit 13a (13b) may collect port information transmitted from the physical switch 40. A port information notification unit 14a (14b) provides notification to the virtual network management apparatus 20 of correspondences between the NIC 15a (15b) and the collected port information.

The virtual network management apparatus 20 instructs the switch control apparatus 30 so that the physical switch 40 uses the port information as a match condition.

On receiving a correspondence between the virtual network and the NIC from a user terminal (not illustrated in the drawings), the virtual network management apparatus 20 may use the correspondence between the NIC and the port information to further make a correspondence between the virtual network and the port information. In addition, based on the correspondence between the virtual network and the port information, the virtual network management apparatus 20 may instruct the switch control apparatus 30 so that the physical switch 40 performs communication among ports belonging to the same virtual network.

According to this communication system, in a communication system providing a virtual network in a cloud infrastructure, it is possible to obtain port information from adjacent physical switches, and to automatically perform setting to the virtual network management apparatus 20. That is, according to this communication system, in a cloud infrastructure with a network configuration where virtual switches are not used, it is possible to automatically set a virtual network, similar to the case of using virtual switches.

Figure 2:
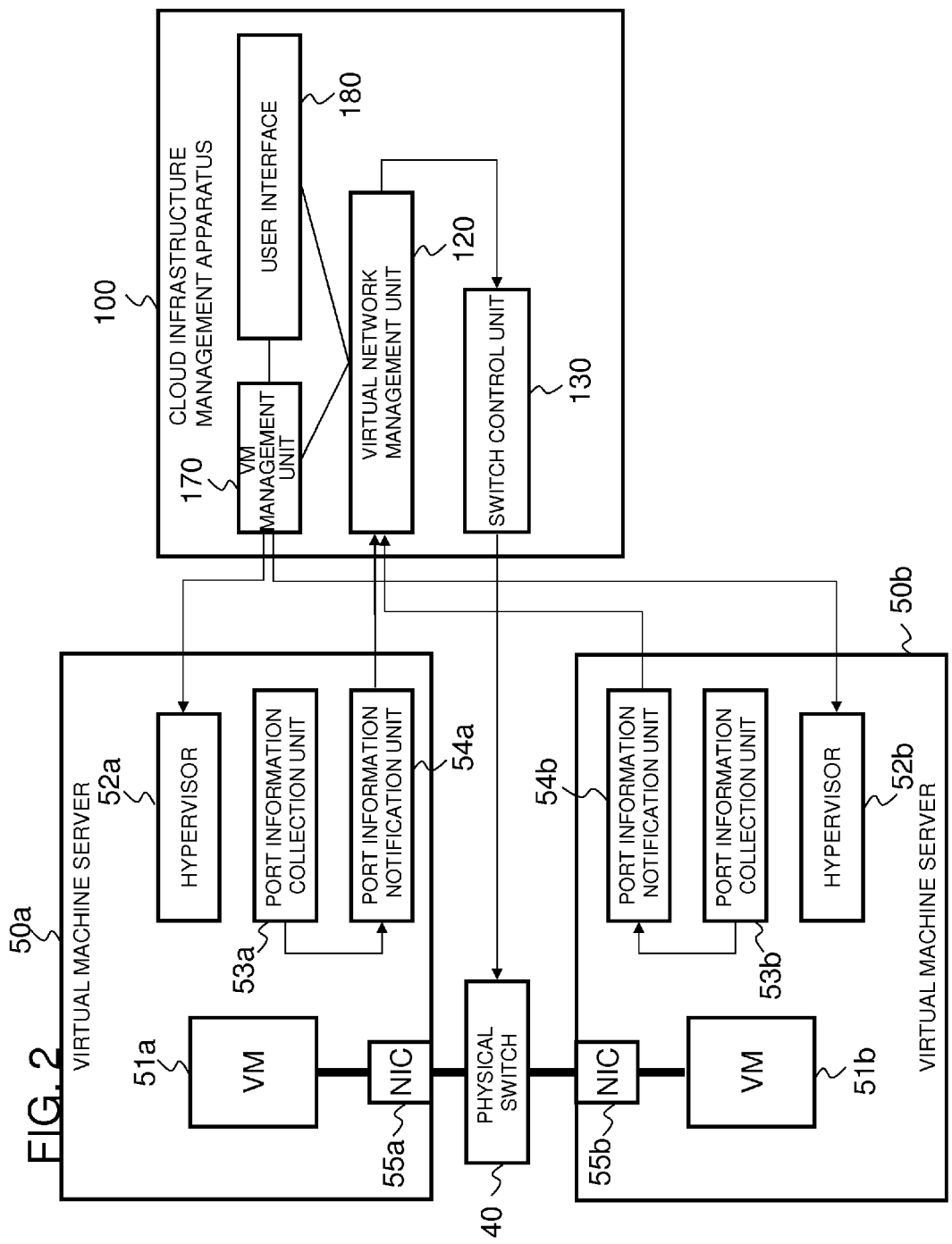
FIG. 2 is a diagram showing a configuration of a communication system according to a first exemplary embodiment.

Referring to FIG. 2, a further description is given concerning a case where physical machines are virtual machine servers 50a and 50b that provide virtual machines. It is to be noted that in FIG. 2, a virtual network management unit 120 is equivalent to the virtual network management apparatus 20 of FIG. 1. Meanwhile, the switch control unit 130 is equivalent to the switch control apparatus 30 of FIG. 1.

Referring to FIG. 2, the communication system has a configuration that connects virtual machine servers 50a and 50b, operated by virtual machines (VM) 51a and 51b, respectively; the virtual network management unit 120 that provides a function for managing the virtual network using the physical switch 40 and the virtual machines 51a and 51b that respectively operate on the virtual machine servers 50a and 50b; and a switch control unit 130 that operates the physical switch 40.

Specifically, the virtual machine server 50a (50b) has a hypervisor 52a (52b) that manages the virtual machine 51a (51b); a port information collection unit 53a (53b) that collects port information of a NIC (Network Interface Card) 55a (55b) assigned to the virtual machine 51a (51b) when the virtual machine 51a (51b) is connected to the virtual network via the virtual network management unit 120; and a port information notification unit 54a (54b) that provides notification of port information of the NIC 55a (55b) used by the virtual machine 51a (51b) to the virtual network management unit 120.

By analyzing an LLDP (Link Layer Discovery Protocol) transmitted from respective ports of the physical switch 40 according to an instruction from the switch control unit 130, the port information collection unit 53a (53b) collects port information. However, the method of collecting port information by the port information collection unit 53a (53b) is not limited to this method. Since it is sufficient if the port information is collected until the NIC 55a (55b) is assigned to the virtual machine 51a (51b), the port information collection unit 53a (53b) may collect port information just before generation of the virtual machine 51a (51b) or when the virtual machine server 50a (50b) is started up.

Correspondence between the virtual network and the NIC 55a (55b) is set by a user in the virtual network management unit 120. The virtual network management unit 120 holds port information of the NIC 55a (55b) based on the above-mentioned notification. Based on the correspondence between the virtual network and port information obtained from this information, the virtual network management unit 120 instructs the switch control apparatus 30 to perform control of the virtual network using the port information as a match condition for identifying packets. It is to be noted that, as the match condition, not only local identifying information but also transmission source address, destination address, input port and the like can be specified.

For example, an assumption is made that the NIC 55a (55b) respectively assigned to the virtual machine server 50a (50b) is set in the same virtual network by the user. As shown in FIG. 2, when the virtual machine 51a is connected to the virtual network via the virtual network management unit 120, the virtual machine server 50a obtains the LLDP including port information from the physical switch 40 to which the NIC 55a is connected, at the NIC 55a assigned to the virtual machine 51a, and provides notification of the obtained port information to the virtual network management unit 120.

Similarly, as shown in FIG. 2, when the virtual machine 51b is connected to the virtual network via the virtual network management unit 120, the virtual machine server 50b also obtains the LLDP including port information from the physical switch 40 to which the NIC 55*b* is connected, at the NIC 55*b* assigned to the virtual machine 51*b*, and provides notification of the obtained port information to the virtual network management unit 120.

Next, in the virtual network management unit 120, correspondences of the virtual network and port information are generated from port information of the NIC 55*a* and 55*b* obtained by the abovementioned notification, and an instruction is given to the switch control unit 130 that communication is permitted only among ports belonging to the same virtual network.

In accordance with the instruction from the virtual network management unit 120, the switch control unit 130 instructs the physical switch 40 to transmit packets from a port of the virtual machine 51*a* (51*b*) to any of, or all, ports belonging to the same virtual network.

According to the above description, packets from the virtual machine 51*a* are forwarded to the virtual machine 51*b*, and on the other hand, packets from the virtual machine 51*b* are forwarded to the virtual machine 51*a*.

According to the communication system of this exemplary embodiment, in a communication system that provides a virtual network in a cloud infrastructure, it is possible to obtain port information from adjacent switches, and to automatically perform setting to a virtual network management apparatus. Therefore, according to the configuration of this exemplary embodiment, in a cloud infrastructure for a network configuration where virtual switches are not used, it is possible to automatically set a virtual network, similar to the case of using virtual switches.

First Exemplary Embodiment

Next, a detailed description is given concerning a communication system according to a first exemplary embodiment, making reference to the drawings. FIG. 2 is a block diagram showing an example of a configuration of the communication system according to the present exemplary embodiment. Referring to FIG. 2, the communication system of the present exemplary embodiment is provided with a configuration connecting a cloud infrastructure management apparatus 100, and virtual machine servers 50*a* and 50*b* that are connected via a physical switch 40.

The cloud infrastructure management apparatus 100 has a virtual network management unit 120, a switch control unit 130, a virtual machine (VM) management unit 170, and a user interface 180.

The switch control unit 130 corresponds to the switch control apparatus 30 shown in FIG. 1. The virtual network management unit 120, the virtual machine (VM) management unit 170 and the user interface 180 are equivalent to the virtual network management apparatus 20 shown in FIG. 1.

The user interface 180 receives operations concerning the configuration of the virtual network from a user terminal (not illustrated).

The VM management unit 170 communicates with hypervisors 52*a* and 52*b* of virtual machine servers 50*a* and 50*b*, based on content of an operation concerning the virtual network, received by the virtual network management unit 120 via the user interface 180, and performs virtual machine addition, modification, removal and the like.

The virtual network management unit 120 receives a setting for a correspondence relationship between a NIC (Network Interface Card) of a virtual machine and a virtual network to which the NIC is connected, from the user interface 180. The virtual network management unit 120 receives notification of port information to which the NIC of an added virtual machine is connected, from the virtual machine server 50*a*, 50*b*. On receiving the notification, the virtual network management unit 120 instructs the switch control unit 130 to control the physical switch 40.

The switch control unit 130 controls the physical switch 40, based on an instruction from the virtual network management unit 120. As an example, the switch control unit 130 performs communication control between virtual machines belonging to the same virtual network. As an example, for the switch control unit 130 it is possible to use a configuration equivalent to an OpenFlow controller as described in Non-Patent Literature 3 and 4. However, the switch control unit 130 is not limited to this configuration. The switch control unit 130 transmits, to the physical switch 40, an LLDP (Link Layer Discovery Protocol) that includes an identifier of the physical switch 40 from each port and a port number, periodically or at a time of link up.

In the virtual machine server 50*a* (50*b*), the virtual machine (VM) 51*a* (51*b*) operates under the control of the hypervisor 52*a* (52*b*). The hypervisor 52*a* (52*b*) receives the structure of the virtual network and the virtual machine connection operations, via the VM management unit 170 of the cloud infrastructure management apparatus 100. The virtual machine server 50*a* (50*b*) is provided with a port information collection unit 53*a* (53*b*), a port information notification unit 54*a* (54*b*), and a NIC 55*a* (55*b*) assigned to the virtual machine 51*a* (51*b*).

By analyzing the LLDP transmitted from respective ports of the physical switch 40 according to an instruction from the switch control unit 130, the port information collection unit 53*a* (53*b*) collects port information.

The port information notification unit 54*a* (54*b*) provides notification to the virtual network management apparatus 120 of the collected port information.

As an example, for the physical switch 40 it is possible to use a switch that performs packet processing equivalent to an OpenFlow switch as described in Non-Patent Literature 3 and 4. However, the physical switch 40 is not limited to this switch.

FIG. 3 is a diagram showing, as an example, port information included in the LLDP transmitted from respective ports of the physical switch 40 by the switch control unit 130. Referring to FIG. 3, the LLDP has a variable length format, formed of Type, Length and Value, and includes character string Length and Value, for each Type equivalent to switch identification information and port information.

Figure 4:
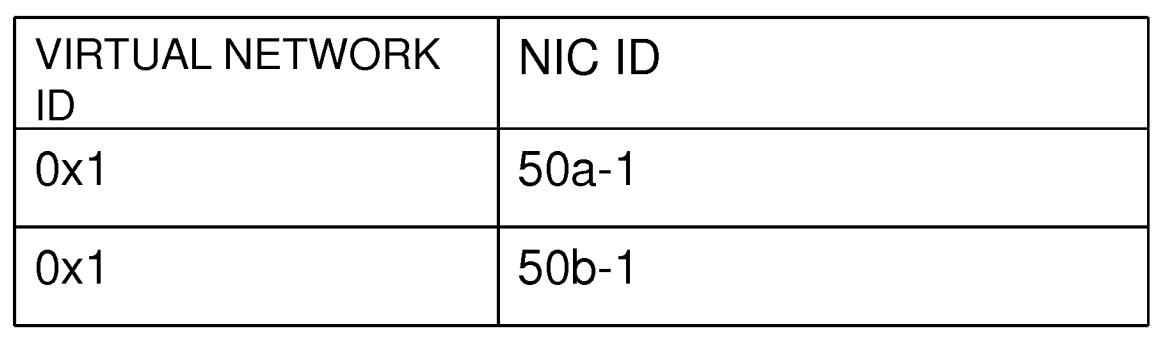

FIG. 4 is a diagram showing an example of correspondence relationships between the NIC of a virtual machine and a virtual network to which the NIC is connected, as set in the virtual network management unit 120 via the user interface 180. Referring to FIG. 4, the virtual network management unit 120 holds correspondence relationships between virtual network ID and NIC ID belonging thereto.

FIG. 5 is an example of port information of a NIC, notified from the virtual machine server 50*a* (50*b*) and held in the virtual network management unit 120. Referring to FIG. 5, the virtual network management unit 120 holds switch identification information and port number for each NIC ID. As an example, in the case of OpenFlow, it is possible to use DPID (Datapath ID) as switch identification information. However, the identification information is not limited to DPID, and may be any information by which a switch can be uniquely identified.

FIG. 6 is a diagram showing an example of correspondence relationships between virtual networks and port information, as held by the virtual network management unit 120. Based on correspondence relationships between the virtual networks and NICs as shown in FIG. 4, and correspondence relationships between NICs and port information as shown in FIG. 5, correspondence relationships between the virtual networks and port information are generated and held, as shown in FIG. 6.

According to the abovementioned configuration, the cloud infrastructure management apparatus 100 is notified of port information collected based on the LLDP transmitted from the physical switch 40 by the virtual machine server 50a, 50b; and by the cloud infrastructure management apparatus 100 making correspondences between the virtual network and port information as set by a user, via NIC IDs, it is possible to automate the setting of the virtual network.

It is to be noted that in FIG. 4 and FIG. 5, as the NIC ID, virtual machine server identification information and NIC identification information in the virtual machine server 50a (50b) are used as NIC ID. However, the NIC ID is not limited to the identifiers shown in FIG. 4 and FIG. 5, and may be any identifier that is unique in the cloud infrastructure. For example, virtual machine identification information and NIC identification information in the virtual machine 51a (51b) may be used as NIC ID.

It is to be noted that the respective parts (processing means) of the virtual machine servers 50a and 50b and the cloud infrastructure management apparatus 100 shown in FIG. 2 may be implemented by a computer program that executes the abovementioned respective processing on a hardware resource (a computer resource such as a CPU (Central Processing Unit) and memory etc.) configuring these apparatuses.

Next, a detailed description is given concerning operations of the communication system according to the present exemplary embodiment.

First, when the user interface 180 of the cloud infrastructure management apparatus 100 receives a virtual machine generation request from a user terminal, the VM management unit 170 instructs the hypervisor 52a (52b) to generate the virtual machine 51a (51b).

Here, based on a virtual network designation of the NIC 55a (55b) in the virtual machine generation request, a correspondence relationship (see FIG. 4) between the virtual network and the NIC 55a (55b) is set in the virtual network management unit 120.

Next, the hypervisor 52a (52b) instructs the port information collection unit 53a (53b) to collect port information of a NIC assigned to the generated virtual machine 51a (51b).

The port information collection unit 53a (53b) obtains the LLDP including port information transmitted from the physical switch 40, at the NIC 55a (55b), and passes the port information extracted to the port information notification unit 54a (54b). Specifically, the port information collection unit 53a collects switch identification information 0x1001 and port number 1 as port information. Meanwhile, the port information collection unit 53b collects switch identification information 0x1001 and port number 2 as port information. It is to be noted that in order to obtain the LLDP, a link of the NIC 55a (55b) may be temporarily shut down and then restarted.

The port information notification unit 54a (54b) notifies the NIC port information (FIG. 5) to the virtual network management unit 120 of the cloud infrastructure management apparatus 100.

The virtual network management unit 120 generates correspondence relationships (FIG. 6) between the virtual network and port information based on correspondence relationships (FIG. 4) between the virtual network and the NIC 55a (55b), and port information (FIG. 5) of the NIC 55a (55b). Next, the virtual network management unit 120 instructs the switch control unit 130 so that communication is allowed only between ports with port number 1 with switch identification information 0x1001 and port number 2 with switch identification information 0x1001, belonging to virtual network 0x1.

In accordance with the instruction from the virtual network management unit 120, the switch control unit 130 instructs the physical switch 40 with regard to switch identification information 0x1001 to forward packets with input port 1 to port number 2. Similarly, the switch control unit 130 instructs the physical switch 40 with regard to switch identification information 0x1001 to forward packets with input port 2 to port number 1.

From the above, packets from the virtual machine 51a are forwarded to the virtual machine 51b, and packets from the virtual machine 51b are forwarded to the virtual machine 51a. It is to be noted that where there are 3 or more NICs belonging to the same network, broadcast or multicast forwarding may be performed.

As described above, in the communication system according to the present exemplary embodiment, port information is collected for each NIC 55a (55b) of the virtual machine 51a (51b), correspondences between the virtual network and port information are generated, from correspondence relationships between the virtual network and the NIC 55a (55b) set in the cloud infrastructure management apparatus 100, and the physical switch 40 is controlled. According to this communication system, in a cloud infrastructure for a network configuration where virtual switches are not used, it is possible to automatically set a virtual network, similar to the case of using virtual switches.

Second Exemplary Embodiment

Next, a description is given concerning a communication system according to a second exemplary embodiment, making reference to the drawings. The communication system of the present exemplary embodiment is one in which a virtual machine server in the communication system according to the first exemplary embodiment is changed to a physical machine.

Figure 7:
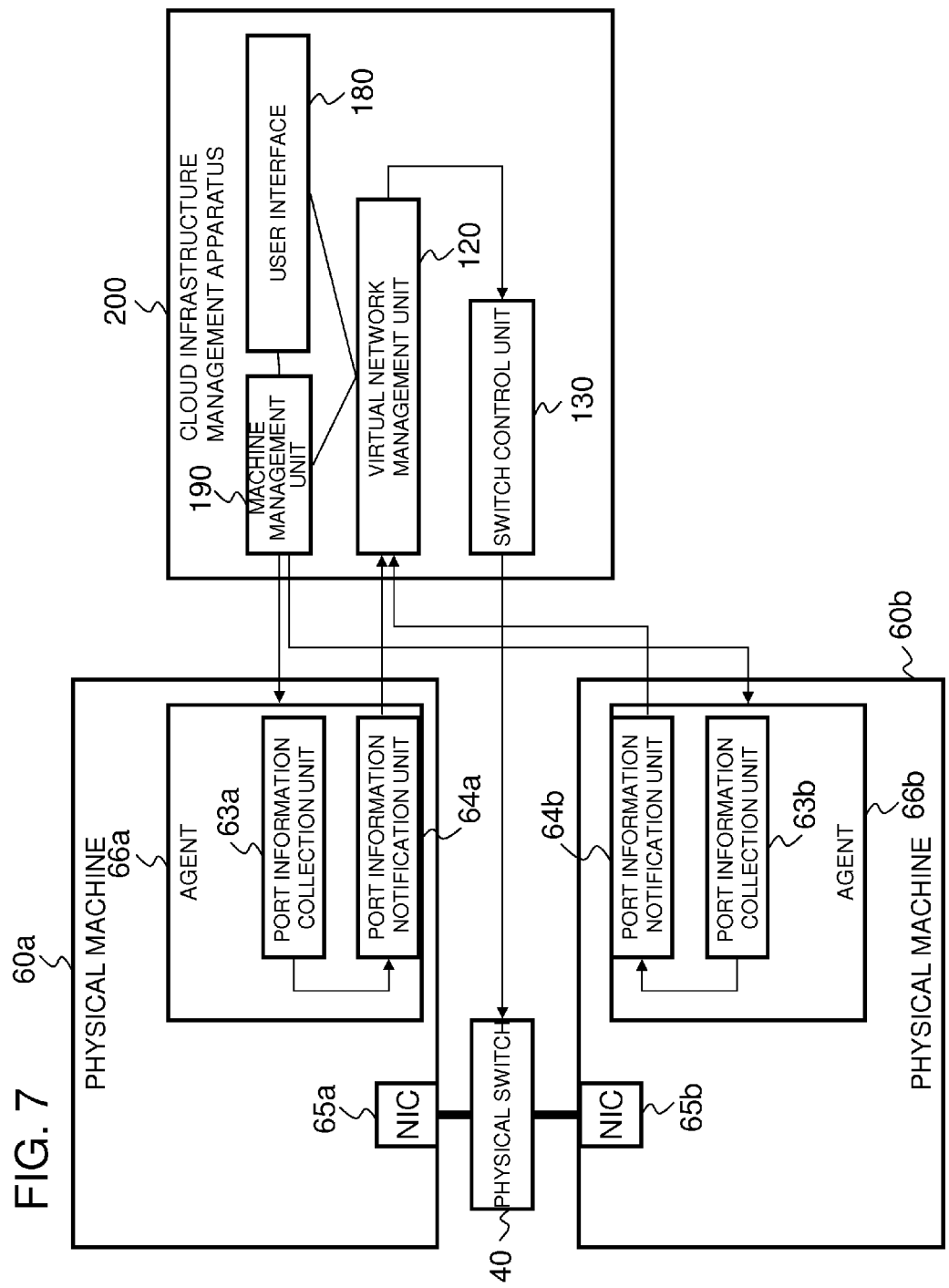
FIG. 7 is a diagram showing a configuration of a communication system according to a second exemplary embodiment.

FIG. 7 is a block diagram showing an example of a configuration of the communication system according to the present exemplary embodiment. The communication system of the present exemplary embodiment and the communication system of the first exemplary embodiment shown in FIG. 2 differ in the point regarding whether an object lent to a user is a virtual machine (VM) or a physical machine. Otherwise, the configuration of the communication system of the present exemplary embodiment is similar to the communication system of the first exemplary embodiment. Therefore, the description below is centered on differences between the present exemplary embodiment and the first exemplary embodiment.

Referring to FIG. 7, the communication system of the present exemplary embodiment is provided with a configuration connecting a cloud infrastructure management apparatus 200, and physical machines 60a and 60b that are connected via a physical switch 40. The physical machine 60a (60b) has a NIC (Network Interface Card) 65a (65b).

The physical machine 60a (60b) has an agent 66a (66b) that operates temporarily before lending to the user. The agent 66a (66b) has a port information collection unit 63a (63b) and a port information notification unit 64a (64b), similar to the virtual machine server 50a (50b) in the communication system of the first exemplary embodiment.

The cloud infrastructure management apparatus 200 is provided with a machine management unit 190. On receiving a machine request from a user terminal, the machine management unit 190 starts up the physical machine 60a (60b), and instructs pre-processing by the agent 66a (66b).

Next, a detailed description is given concerning operations of the communication system according to the present exemplary embodiment.

First, when a user interface 180 of the cloud infrastructure management apparatus 200 receives a machine request from a user terminal, the machine management unit 190 instructs the physical machine 60a (60b) to start up an OS (Operating System) and the agent 66a (66b).

Next, based on a virtual network designation of the NIC 65a (65b) in the machine request, a correspondence relationship between the virtual network and the NIC 65a (65b) is set in a virtual network management unit 120.

Next, the agent 66a (66b) instructs the port information collection unit 63a (63b) to collect port information of the NIC 65a (65) that the user can use.

The port information collection unit 63a (63b) obtains the LLDP including port information transmitted from the physical switch 40, at the NIC 65a (65b), similar to the port information collection unit 53a (53b) in the communication system of the first exemplary embodiment, and passes the extracted port information to the port information notification unit 64a (64b).

The port information notification unit 64a (64b) gives notification of the port information of the NIC 65a (65b) to the virtual network management unit 120 of the cloud infrastructure management apparatus 200.

Next, after the machine management unit 190 and agent 66a (66b) perform processing such as writing a user's machine image to a HDD (Hard Disk Drive), the physical machine 60a (60b) is restarted with the user's machine image. It is to be noted that processing with regard to the NIC 65a (65b) and the virtual network is not an object of the present invention, and processing content and procedures thereof are not an issue.

Since operations after notification of port information to the virtual network management unit 120 are the same as in the communication system of the first exemplary embodiment, a description thereof is omitted.

From the above, packets from the physical machine 60a are forwarded to the physical machine 60b. On the other hand, packets from the physical machine 60b are forwarded to the physical machine 60a.

As described above, in the communication system according to the present exemplary embodiment, port information is collected for each NIC 65a (65b) of the physical machine 60a (60b), correspondences between the virtual network and port information are generated, from correspondence relationships between the virtual network and the NIC 65a (65b) set in the cloud infrastructure management apparatus 200, and the physical switch 40 is controlled. According to the communication system in question, in a bare metal cloud infrastructure that does not use virtual switches, it is possible to automate the setting of the virtual network, similar to a general cloud environment that uses virtual switches.

A description has been given above of respective exemplary embodiments, but the present invention is not limited to the abovementioned exemplary embodiments, and further modifications, substitutions and adjustments may be added within a scope that does not depart from fundamental technical concepts of the invention. For example, network configuration and element configuration shown in the respective drawings are examples in order to aid understanding of the invention, and are not intended to limit the invention to configurations illustrated in the drawings.

For example, in the abovementioned exemplary embodiments a description was given where the cloud infrastructure management apparatus 200 is provided with the switch control unit 130 that performs switch control equivalent to an OpenFlow controller of Non-Patent Literature 3 and 4, but the communication system according to the present invention can also be applied to other cloud infrastructure platforms. For example, the communication system according to the present invention can be applied to a network in which a control server performs centralized management of the network.

According to the present invention, modes are provided as described below.

(Mode 1)

A communication system may be the communication system according to the first aspect described above.

(Mode 2)

The communication system according to mode 1, wherein the virtual network management apparatus, upon reception of a correspondence between the virtual network and the NIC from a user terminal, uses the correspondence between the NIC and the port information to further make a correspondence between the virtual network and the port information.

(Mode 3)

The communication system according to mode 2, wherein the virtual network management apparatus, based on the correspondence between the virtual network and the port information, instructs the switch control apparatus so that the physical switch performs communication among ports belonging to a same virtual network.

(Mode 4)

The communication system according to any one of modes 1 to 3, wherein the switch control apparatus instructs the physical switch to transmit the port information, and the port information collection unit collects the port information transmitted from the physical switch.

(Mode 5)

A physical machine may be the physical machine according to the second aspect described above.

(Mode 6)

The physical machine according to mode 5, wherein the port information collection unit collects the port information transmitted from the physical switch in accordance with an instruction of the switch control apparatus.

(Mode 7)

A virtual network management apparatus may the virtual network management apparatus according to the third aspect described above.

(Mode 8)

The virtual network management apparatus according to mode 7, wherein the instructing means, upon reception of a correspondence between the virtual network and the NIC from a user terminal, uses the correspondence between the NIC and the port information notified from the physical machine, to further make a correspondence between the virtual network and the port information.

(Mode 9)
The virtual network management apparatus according to mode 8, wherein
the instructing means, based on the correspondence between the virtual network and the port information, instructs the switch control apparatus so that the physical switch performs communication among ports belonging to a same virtual network.

(Mode 10)
A network control method may the network control method according to the fourth aspect described above.

(Mode 11)
The network control method according to mode 10, comprising:
by the virtual network management apparatus, upon reception of a correspondence between the virtual network and the NIC from a user terminal, uses the correspondence between the NIC and the port information to further make a correspondence between the virtual network and the port information.

(Mode 12)
The network control method according to mode 11, comprising:
by the virtual network management apparatus, based on the correspondence between the virtual network and the port information, instructing the switch control apparatus so that the physical switch performs communication among ports belonging to a same virtual network.

(Mode 13)
The network control method according to any one of modes 10 to 12, comprising:
by the switch control apparatus, instructing the physical switch to transmit the port information; and
by the physical machine, collecting the port information transmitted from the physical switch.

(Mode 14)
A port information collection method in a communication system comprising a switch control apparatus that controls a physical switch and a virtual network management apparatus that manages a virtual network, the port information collection method comprising:
by a physical machine connected to the physical switch, collecting port information of a NIC (Network Interface Card) assigned to the virtual network; and
notifying the virtual network management apparatus of a correspondence between the NIC and the collected port information, wherein
the virtual network is configured using the physical switch and at least one of the physical machine and a virtual machine operating on the physical machine, and
the virtual network management apparatus instructs the switch control apparatus so that the port information is used as a match condition by the physical switch.

(Mode 15)
The port information collection method according to mode 14, comprising:
by the physical machine, collecting the port information transmitted from the physical switch in accordance with an instruction of the switch control apparatus.

(Mode 16)
A network control method for a communication system provided with a physical machine and a switch control apparatus that controls a physical switch connected to the physical machine, the network control method comprising:
by a virtual network management apparatus, managing a virtual network using the physical switch and at least one of the physical machine and a virtual machine operating on the physical machine; and
upon notification from the physical machine of port information of a NIC (Network Interface Card) assigned to the virtual network, instructing the switch control apparatus so that the physical switch uses the port information as a match condition.

(Mode 17)
The network control method according to mode 16 comprising:
by the virtual network management apparatus, receiving a correspondence between the virtual network and the NIC from a user terminal; and
using the correspondence between the NIC and the port information notified by the physical machine to further make a correspondence between the virtual network and the port information.

(Mode 18)
The network control method according to mode 16 comprising:
by the virtual network management apparatus, based on the correspondence between the virtual network and the port information, instructing the switch control apparatus so that the physical switch performs communication among ports belonging to a same virtual network.

(Mode 19)
A program used in a communication system comprising a switch control apparatus that controls a physical switch and a virtual network management apparatus that manages a virtual network, the program causing a computer provided in a physical machine connected to the physical switch to execute:
collecting port information of a NIC (Network Interface Card) assigned to the virtual network; and
notifying the virtual network management apparatus of a correspondence between the NIC and the collected port information, wherein
the virtual network is configured using the physical switch and at least one of the physical machine and a virtual machine operating on the physical machine, and
the virtual network management apparatus instructs the switch control apparatus so that the port information is used as a match condition by the physical switch.

(Mode 20)
A program used in a communication system comprising a physical machine and a switch control apparatus that controls a physical switch connected to the physical machine, the program causes a computer to execute:
managing a virtual network using the physical switch and at least one of the physical machine and a virtual machine operating on the physical machine; and
upon notification from the physical machine of port information of a NIC (Network Interface Card) assigned to the virtual network, instructing the switch control apparatus so that the physical switch uses the port information as a match condition.

(Mode 21)
A non-transitory computer-readable storage medium that holds the program according to mode 19 or 20.

It is to be noted that the various disclosures of the abovementioned Patent Literature and Non-Patent Literature are incorporated herein by reference thereto. Modifications and adjustments of exemplary embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

10a, 10b, 60a, 60b physical machine
13a, 13b, 53a, 53b, 63a, 63b port information collection unit
14a, 14b, 54a, 54b, 64a, 64b port information notification unit
15a, 15b, 55a, 55b, 65a, 65b NIC
virtual network management apparatus
30 switch control apparatus
40 physical switch
50a, 50b virtual machine server
51a, 51b virtual machine (VM)
52a, 52b hypervisor
66a, 66b agent
100, 200 cloud infrastructure management apparatus
120 virtual network management unit
130 switch control unit
170 virtual machine (VM) management unit
180 user interface
190 machine management unit

What is claimed is:

1. A communication system, comprising:
a physical machine;
a switch control apparatus that controls a physical switch connected to the physical machine; and
a virtual network management apparatus that is a computing device and that manages a virtual network using the physical switch and at least one of the physical machine and a virtual machine operating on the physical machine, wherein
the physical machine comprises:
a processor;
a non-transitory computer-readable data storage medium storing code executable by the processor to:
collect port information of a NIC (Network Interface Card) assigned to the virtual network; and
notify the virtual network management apparatus of a correspondence between the NIC and the collected port information,
receive a correspondence between virtual network and the NIC from a user terminal, the virtual network management apparatus generates correspondence between the virtual network and the port information based on the received correspondence between the virtual network and the NIC from a user terminal and the notified correspondence between the NIC and the port information notified from the physical machine; and
the virtual network management apparatus instructs the switch control apparatus based on the generated correspondence between the virtual network and the port information to use the port information as a match condition for identifying packets at the physical switch.

2. The communication system according to claim 1, wherein
the virtual network management apparatus, upon reception of a correspondence between the virtual network and the NIC from a user terminal, uses the correspondence between the NIC and the port information to further make a correspondence between the virtual network and the port information.

3. The communication system according to claim 2, wherein the virtual network management apparatus, based on the correspondence between the virtual network and the port information, instructs the switch control apparatus to control the physical switch to perform communication among ports belonging to a same virtual network.

4. The communication system according to claim 1, wherein
the switch control apparatus instructs the physical switch to transmit the port information, and
the physical machine collects the port information transmitted from the physical switch.

5. A physical machine in a communication system comprising a switch control apparatus that controls a physical switch and a virtual network management apparatus that is a computing device and that manages a virtual network, the physical machine being connected to the physical switch, the physical machine comprising:
a processor;
a non-transitory computer-readable data storage medium storing code to:
collect port information of a NIC (Network Interface Card) assigned to the virtual network; and
notify the virtual network management apparatus of a correspondence between the NIC and the collected port information, wherein the virtual network is configured using the physical switch and at least one of the physical machine and a virtual machine operating on the physical machine;
receive a correspondence between virtual network and the NIC from a user terminal, the virtual network management apparatus generates correspondence between the virtual network and the port information based on the received correspondence between the virtual network and the NIC from a user terminal and the notified correspondence between the NIC and the port information notified from the physical machine; and the virtual network management apparatus instructs the switch control apparatus based on the generated correspondence between the virtual network and the port information to use the port information as a match condition for identifying packets at the physical switch.

6. The physical machine according to claim 5, wherein the physical machine collects the port information transmitted from the physical switch in accordance with an instruction of the switch control apparatus.

7. A virtual network management apparatus in a communication system comprising a physical machine and a switch control apparatus that controls a physical switch connected to the physical machine, the virtual network management apparatus comprising:
a processor;
a non-transitory computer-readable data storage medium storing code executable by the processor to:
machine a virtual network using the physical switch and at least one of the physical machine and a virtual machine operating on the physical machine; and
wherein upon correspondence between virtual network and a NIC (Network Interface Card) assigned to a virtual network from a user terminal, the virtual network management apparatus generates correspondence between the virtual network and the port information based on the received correspondence between the virtual network and the NIC from a user terminal and the notified correspondence between the NIC and the port information notified from the physical machine, and the virtual network management apparatus instructs the switch control apparatus based on the generated correspondence between the virtual network and the port information to use the port information as a match condition for identifying packets at the physical switch.

8. The virtual network management apparatus according to claim 7, wherein the virtual network management apparatus, upon reception of a correspondence between the virtual network and the NIC from a user terminal, uses the correspondence between the NIC and the port information notified from the physical machine, to further make a correspondence between the virtual network and the port information.

9. The virtual network management apparatus according to claim 8, wherein the virtual network management apparatus, based on the correspondence between the virtual network and the port information, instructs the switch control apparatus to control the physical switch to perform communication among ports belonging to a same virtual network.

10. A network control method in a communication system comprising a physical machine, a switch control apparatus that controls a physical switch connected to the physical machine, and a virtual network management apparatus that is a computing device and that manages a virtual network using the physical switch and at least one of the physical machine and a virtual machine operating on the physical machine, the network control method comprising:

by the physical machine, collecting port information of a NIC (Network Interface Card) assigned to the virtual network;

notifying of a correspondence between the NIC and the collected port information to the virtual network management apparatus, receiving correspondence between virtual network and the NIC from a user terminal, the virtual network management apparatus generates correspondence between the virtual network and the port information based on the received correspondence between the virtual network and the NIC from a user terminal and the notified correspondence between the NIC and the port information notified from the physical machine; and by the virtual network management apparatus, instructing the switch control apparatus based on the generated correspondence between the virtual network and the port information to use the port information as a match condition for identifying packets at the physical switch.

11. The network control method according to claim 10, comprising:

by the virtual network management apparatus, upon reception of a correspondence between the virtual network and the NIC from a user terminal, uses the correspondence between the NIC and the port information to further make a correspondence between the virtual network and the port information.

12. The network control method according to claim 11, comprising: by the virtual network management apparatus, based on the correspondence between the virtual network and the port information, instructing the switch control apparatus to control the physical switch to perform communication among ports belonging to a same virtual network.

13. The network control method according to claim 10, comprising:

by the switch control apparatus, instructing the physical switch to transmit the port information; and by the physical machine, collecting the port information transmitted from the physical switch.

14. A port information collection method in a communication system comprising a switch control apparatus that controls a physical switch and a virtual network management apparatus that is a computing device and that manages a virtual network, the port information collection method comprising:

by a physical machine connected to the physical switch, collecting port information of a NIC (Network Interface Card) assigned to the virtual network; and notifying the virtual network management apparatus of a correspondence between the NIC and the collected port information, wherein the virtual network is configured using the physical switch and at least one of the physical machine and a virtual machine operating on the physical machine, receiving correspondence between virtual network and the NIC from a user terminal, the virtual network management apparatus generates correspondence between the virtual network and the port information based on the received correspondence between the virtual network and the NIC from a user terminal and the notified correspondence between the NIC and the port information notified from physical machine, and the virtual network management apparatus instructs the switch control apparatus based on the generated correspondence between the virtual network and the port information so that the port information is used as a match condition by the physical switch, the virtual network management apparatus instructs the switch control apparatus based on the generated correspondence between the virtual network and the port information to use the port information as a match condition for identifying packets at the physical switch.

15. The port information collection method according to claim 14, comprising:

by the physical machine, collecting the port information transmitted from the physical switch in accordance with an instruction of the switch control apparatus.

16. A network control method for a communication system provided with a physical machine and a switch control apparatus that controls a physical switch connected to the physical machine, the network control method comprising:

by a virtual network management apparatus, managing a virtual network using the physical switch and at least one of the physical machine and a virtual machine operating on the physical machine, receiving correspondence between virtual network and a NIC (Network Information Card) assigned to the virtual network from a user terminal, the virtual network management apparatus generates correspondence between the virtual network and the port information based on the received correspondence between the virtual network and the NIC from a user terminal and the notified correspondence between the NIC and port information notified from the physical machine; and upon notification from the physical machine of the port information of the NIC, instructing the switch control apparatus based on the generated correspondence between the virtual network and the port information to use the port information as a match condition for identifying packets at the physical switch.

17. The network control method according to claim 16, comprising:
by the virtual network management apparatus, receiving a correspondence between the virtual network and the NIC from a user terminal; and
using the correspondence between the NIC and the port information notified by the physical machine to further make a correspondence between the virtual network and the port information.

18. The network control method according to claim 16, comprising: by the virtual network management apparatus, based on the correspondence between the virtual network and the port information, instructing the switch control apparatus to control the physical switch to perform communication among ports belonging to a same virtual network.

19. A non-transitory computer-readable recording medium, storing a program used in a communication system comprising a switch control apparatus that controls a physical switch and a virtual network management apparatus that is a computing device and that manages a virtual network, wherein
the program causes a computer provided in a physical machine connected to the physical switch to execute:
collecting port information of a NIC (Network Interface Card) assigned to the virtual network; and
notifying the virtual network management apparatus of a correspondence between the NIC and the collected port information, wherein the virtual network is configured using the physical switch and at least one of the physical machine and a virtual machine operating on the physical machine,
receiving correspondence between virtual network and the NIC from a user terminal, the virtual network management apparatus generates correspondence between the virtual network and the port information based on the received correspondence between the virtual network and the NIC from a user terminal and the notified correspondence between the NIC and the port information notified from the physical machine, and
the virtual network management apparatus instructs the switch control apparatus based on the generated correspondence between the virtual network and the port information to use the port information as a match condition for identifying packets at the physical switch.

20. A non-transitory computer-readable recording medium, storing a program used in a communication system comprising a physical machine and a switch control apparatus that controls a physical switch connected to the physical machine, wherein
the program causes a computer to execute:
managing a virtual network using the physical switch and at least one of the physical machine and a virtual machine operating on the physical machine,
receiving correspondence between virtual network and a NIC (Network Information Card) assigned to the virtual network from a user terminal, the virtual network management apparatus generates correspondence between the virtual network and the port information based on the received correspondence between the virtual network and the NIC from a user terminal and the notified correspondence between the NIC and port information notified from the physical machine; and
upon notification from the physical machine of the port information of the NIC, instructing the switch control apparatus based on the generated correspondence between the virtual network and the port information to use the port information as a match condition for identifying packets at the physical switch.

* * * * *